Sept. 20, 1966  J. T. PHILLIPS ETAL  3,273,620
TIRE CHAINS
Filed Aug. 14, 1964
2 Sheets-Sheet 1
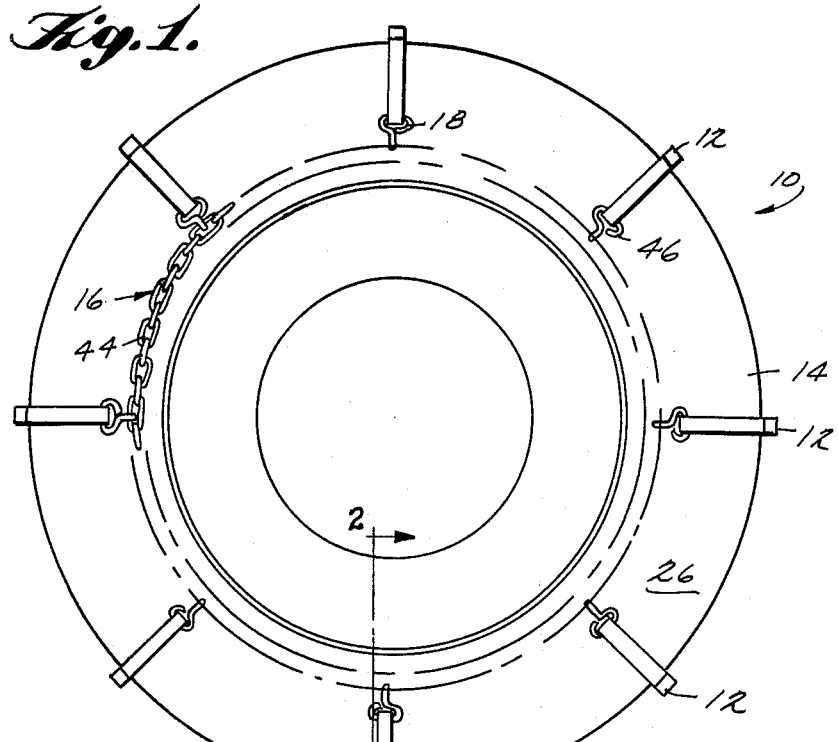
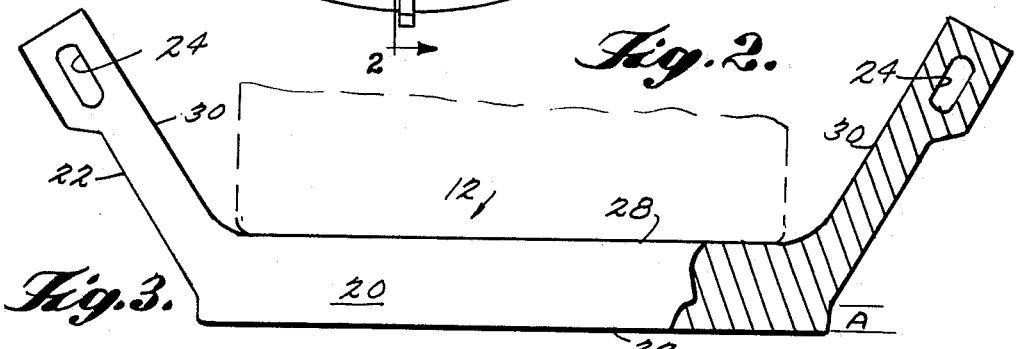
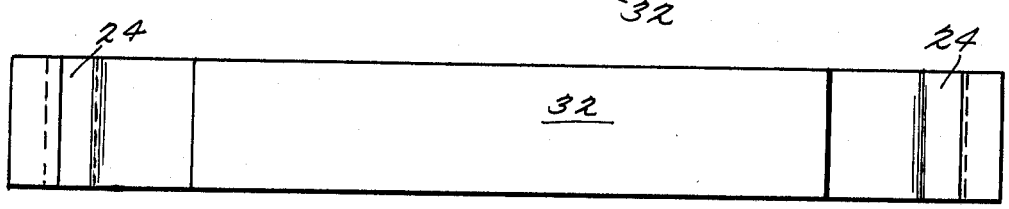
INVENTORS
JAMES T. PHILLIPS
GEORGE D. PHILLIPS
BY Cushman, Darby & Cushman
ATTORNEYS Sept. 20, 1966  J. T. PHILLIPS ETAL  3,273,620
TIRE CHAINS
Filed Aug. 14, 1964  2 Sheets-Sheet 2
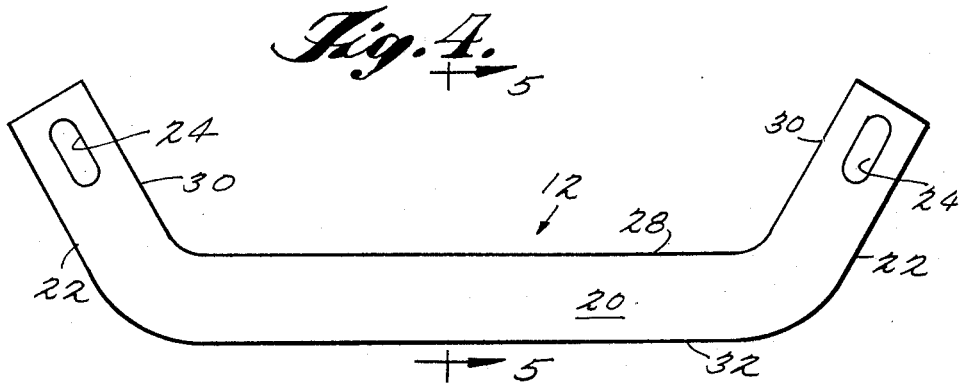
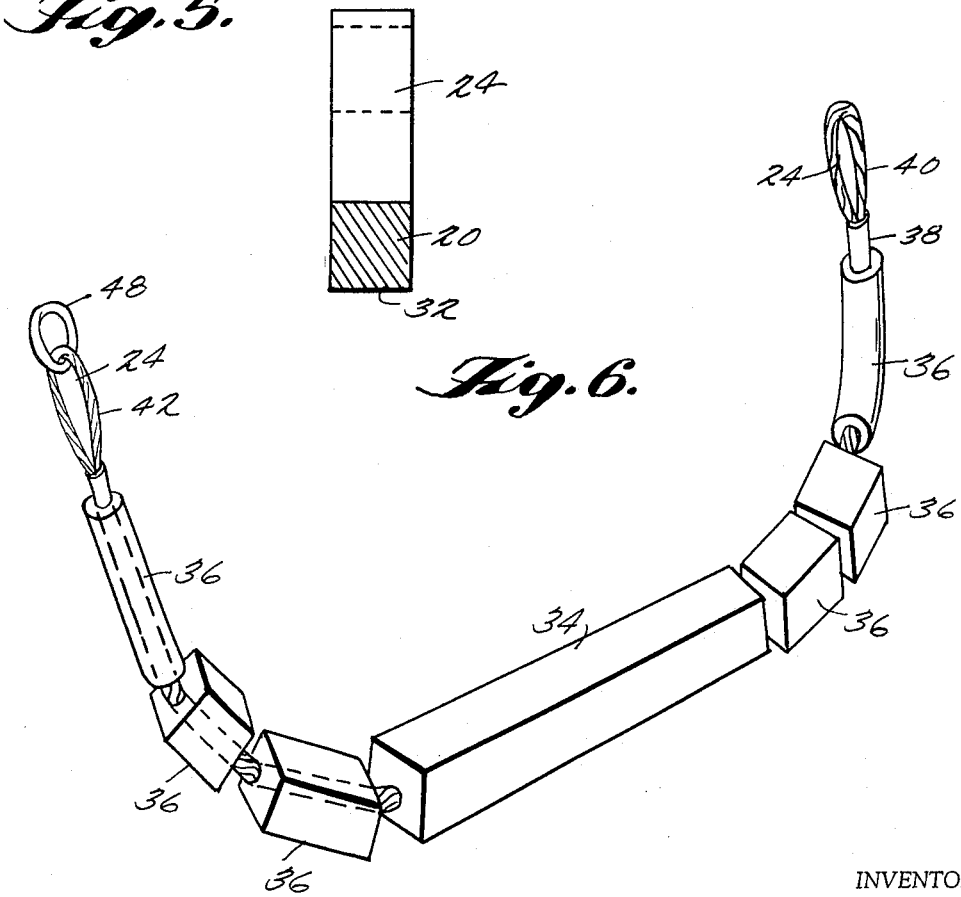
INVENTORS
JAMES T. PHILLIPS
GEORGE D. PHILLIPS
BY Cushman, Darby & Cushman
ATTORNEYS

United States Patent Office 3,273,620
Patented Sept. 20, 1966

3,273,620
TIRE CHAINS
James T. Phillips and George D. Phillips, both of Rte. 2, Southwood Drive, Gastonia, N.C.
Filed Aug. 14, 1964, Ser. No. 389,625
1 Claim. (Cl. 152—228)

This invention relates generally to improvements in traction devices for vehicle wheels, and is particularly directed to a device for installation on a pneumatic or other rubber tire, for example, an automobile tire, for improving the traction thereof on soft or slippery surfaces resulting from snow, ice, sleet, rain or the like.

In the prior art where additional traction is required on the vehicle tire or for anti-skid purposes, it has been the custom to use so-called tire chains which, generally, consist of attaching means disposed one on each side of the tire and a plurality of equally spaced cross chains to form the traction and anti-skid surface over the tread surface of the tire. Gnerally, the cross chains have been made of metal but efforts have been directed to overcome the disadvantages associated with metal cross chains by replacing them with cross chains fabricated from a more resilient material. Thus, in U.S. Patents 2,082,253; 2,580,272; 3,028,901; 3,056,444; 3,079,972 and 3,125,148 materials such as rubber, rubber reinforced with metal or fabric have been disclosed as allegedly suitable materials. Plastics and synthetic resins, generally, have also been taught to be superior to metal as the material from which cross chains can be made in an effort to reduce substantially the noise created by the latter type cross chain when in use and to increase the life of the tire chain generally.

It has been found however that certain disadvantages are associated with prior art tire chains provided with cross chains made of a material more resilient than conventional metal cross chains. In some instances, the durability of the tire chain is increased at a sacrifice of the anti-skid or friction characteristics of the tire chain. The converse has also been experienced and there has not heretofore been available a commercially acceptable tire chain exhibiting not only excellent friction characteristics but also greatly enhanced anti-wear or durability properties.

It is therefore a principal object of the present invention to provide a traction device for vehicle wheels which overcomes the disadvantages of prior art devices.

It is another object of the present invention to provide a traction device for vehicle wheels which is provided with a road engaging surface fabricated from a thermoplastic material characterized by its excellent friction characteristics as well as its significantly enhanced anti-wear or durability properties.

Yet another object of this invention is to provide a tire chain provided with a cross chain which is relatively simple in construction, inexpensive to produce and easy to use.

In accordance with the present invention, the traction device, preferably, includes a plurality of traction elements each formed to fit transversely over the periphery of a tire and fabricated from high molecular weight polyethylene, attaching means securing said traction elements to a vehicle tire and means connecting said traction elements to said attaching means.

The above and other objects, features and advantages of the present invention will be apparent in the following detailed description of illustrative embodiments thereof when read in connection with the accompanying drawings forming a part hereof and wherein:

FIGURE 1 is an elevational view of a traction device embodying the present invention shown mounted upon a vehicle tire;

FIGURE 2 is a sectional view of one embodiment of the traction element of the present invention taken along the line 2—2 of FIGURE 1 but on an enlarged scale;

FIGURE 3 is a bottom plan view of FIGURE 2;

FIGURE 4 is a side elevation of another embodiment of the traction element of the present invention;

FIGURE 5 is a sectional view taken along the line 5—5 of FIGURE 4; and

FIGURE 6 is a perspective view of another embodiment of the traction element of the present invention.

Referring to the drawings in detail, and initially to FIGURE 1 thereof, a traction device embodying the present invention is there shown and generally indicated by the reference numeral 10. The traction device 10 includes a plurality of traction elements 12 secured transversely to the vehicle wheel 14 by attaching means 16. The traction elements 12 are connected to attaching means 16 by connecting means 18.

The traction elements 12 are substantially similar and as one embodiment thereof, shown in FIGURE 2, each of said traction elements includes a body portion 20 provided with rearwardly and outwardly, integrally formed side walls 22. The free end of each side wall 22 is provided with an aperture 24 to removably receive connecting means 18 to connect said traction element to attaching means 16 adjacent the interior and exterior side walls 26 of the vehicle wheel 14. The surface 28 of the body portion 20 which transversely engages the road engaging surface of the vehicle wheel 14 is substantially horizontal and extends a distance substantially equal to the width of said vehicle wheel 14, shown by the dotted line in FIGURE 2. The upper and outer extremities of body portion 20 are rearwardly curving and are integrally united with resilient side walls 22 to provide a rearwardly and outwardly disposed vehicle side wall engaging surface 30. The body portion 20 can also be provided with a projection comprising the ground engaging surface 32 of the traction element 12. Ground engaging surface 32, preferably, extends a distance substantially greater than the width of vehicle wheel 14 and can be provided with any conventional tread design. The free ends of side walls 22 adjacent the apertures 24 are, preferably, reinforced by providing a portion of the side walls having a thickness substantially greater than the remainder of the side wall adjacent the body portion of the traction element. In another embodiment of the invention as shown in FIGURE 4, the projection A can be omitted and the side walls 22 can be of uniform thickness.

Further, as shown in FIGURE 6 which illustrates yet another embodiment of the invention, the traction element 12 can comprise a plurality of spacedly removed units, one of said units 34 extending a distance substantially equal to the vehicle tire tread surface over which it is adapted to travel, the remaining portions 36 extending a distance longitudinally to provide a vehicle tire side wall engaging surface as well as a vehicle tire side wall traction surface especially suitable in deep snow, ruts or embankments. Longitudinally extending through the units 34 and 36 is a wire or cable 38, the free ends 40 and 42 of which are provided with apertures 24 for removably receiving connecting means 18 to secure said traction element to attaching means 16.

The attaching means can comprise, preferably, flexible side chains 44 of link construction extending angularly around the wheel adjacent the tire tread and on both sides of the wheel. Each side chain, preferably, has a fastener at one end thereof to engage a link at the other end thereof. Other attaching means such as conventional tension cables, locking rings and the like can be employed. Connecting means 18 can comprise a hook 46 or other conventional connecting means such as a split ring 48.

The traction element 12 as stated hereinbefore, is fabricated from polyethylene having a molecular weight of about 800,000 or greater. The polyethylene has a density of at least 0.94. Preferably, the traction elements can be molded and can carry any suitable tread on the ground engaging surface thereof. The novel traction device of this invention being made of high molecular weight polyethylene, surprisingly has been found to have a service life at least five to ten times longer than existing prior art devices.

While specific embodiments of the invention have been described in detail and illustrated in the drawings, merely by way of example, it is to be understood that the invention is not limited to those precise embodiments, and that various changes and modifications may be effected therein, by one skilled in the art, without departing from the spirit and scope of the invention as defined in the appended claim.

What is claimed is:

A traction device for a vehicle tire comprising a plurality of high molecular weight polyethylene traction elements adapted to be disposed transversely over the periphery of a vehicle tire, said polyethylene having a density of at least 0.94 and a molecular weight of at least 800,000, attaching means for securing said traction elements to said tire and means connecting said traction elements to said attaching means.

References Cited by the Examiner

UNITED STATES PATENTS

| | | | |
|---|---|---|---|
| 2,073,883 | 3/1937 | Russell | 152—226 |
| 2,352,174 | 6/1944 | Barrows | 152—226 |
| 2,978,277 | 4/1961 | Gaudry. | |
| 3,113,115 | 12/1963 | Ziegler et al. | 268—94.9 |

FOREIGN PATENTS 247,211  9/1963  Australia.

ARTHUR L. LA POINT, *Primary Examiner.*

C. W. HAEFELE, *Assistant Examiner.*